(12) United States Patent
Kozuru et al.

(10) Patent No.: US 10,164,411 B2
(45) Date of Patent: Dec. 25, 2018

(54) SWITCHGEAR

(71) Applicant: MITSUBISHI ELECTRIC CORPORATION, Chiyoda-ku, Tokyo (JP)

(72) Inventors: Susumu Kozuru, Tokyo (JP); Toru Yamaji, Tokyo (JP); Nobukazu Nagayasu, Tokyo (JP); Takahiro Sasaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 58 days.

(21) Appl. No.: 15/307,244

(22) PCT Filed: Sep. 3, 2015

(86) PCT No.: PCT/JP2015/075041
§ 371 (c)(1),
(2) Date: Oct. 27, 2016

(87) PCT Pub. No.: WO2016/047411
PCT Pub. Date: Mar. 31, 2016

(65) Prior Publication Data
US 2017/0054278 A1    Feb. 23, 2017

(30) Foreign Application Priority Data

Sep. 24, 2014   (JP) .................................. 2014-193328

(51) Int. Cl.
*H02B 1/56*    (2006.01)
*H02B 1/14*    (2006.01)
(Continued)

(52) U.S. Cl.
CPC .................. *H02B 1/56* (2013.01); *H02B 1/14* (2013.01); *H02B 1/16* (2013.01); *H02B 1/565* (2013.01); *H02B 13/025* (2013.01); *H02B 11/24* (2013.01)

(58) Field of Classification Search
CPC .......... H01H 9/342; H01H 9/302; H01H 9/36; H01H 73/18; H01H 9/46; H01H 33/53;
(Continued)

(56) References Cited

U.S. PATENT DOCUMENTS 5,710,402 A * 1/1998 Karnbach ............... H02B 1/565
218/157
5,861,596 A * 1/1999 Grass ..................... H01H 9/342
218/105

(Continued)

FOREIGN PATENT DOCUMENTS

DE    83 12 297 U1    10/1983
JP    56-120040 A     9/1981
(Continued)

OTHER PUBLICATIONS

International Search Report (PCT/ISA/210) dated Dec. 1, 2015, by the Japanese Patent Office as the International Searching Authority for International Application No. PCT/JP2015/075041.
(Continued)

*Primary Examiner* — Truc Nguyen
(74) *Attorney, Agent, or Firm* — Buchanan Ingersoll & Rooney PC

(57) ABSTRACT

A switchgear according to the present invention includes: an air intake mechanism attachment body arranged on an air intake portion provided on a housing; an air intake opening provided in the air intake mechanism attachment body; a check valve type shutter which is arranged on the inner side of the air intake opening on the housing, performs an air
(Continued)

intake from the outside of the housing, and blocks the air intake opening in the occurrence of an internal short circuit fault; and a ground fault partition body which is arranged between said check valve type shutter and a conductive portion in said housing and in which the length of at least one side is longer than said check valve type shutter.

10 Claims, 6 Drawing Sheets

(51) Int. Cl.
*H02B 1/16* (2006.01)
*H02B 13/025* (2006.01)
*H02B 11/24* (2006.01)

(58) Field of Classification Search
CPC ............ H01H 9/346; H01H 2009/347; H01H 2009/365; H01H 2033/566; H01H 33/666; H01H 9/362; H01H 2077/025; H01H 33/022
See application file for complete search history.

(56) References Cited

U.S. PATENT DOCUMENTS

| | | | | |
|---|---|---|---|---|
| 6,144,001 | A * | 11/2000 | Green | H01H 9/0264 |
| | | | | 200/304 |
| 6,205,017 | B1 * | 3/2001 | Wilkie, II | H02B 1/21 |
| | | | | 174/70 B |
| 7,952,857 | B1 * | 5/2011 | Motley | H02B 13/025 |
| | | | | 361/678 |
| 8,946,581 | B2 * | 2/2015 | Yabu | H01H 33/66207 |
| | | | | 218/119 |
| 9,627,866 | B2 * | 4/2017 | Pawar | H02B 1/56 |
| 2009/0141432 | A1 * | 6/2009 | Kingston | H02B 13/025 |
| | | | | 361/676 |
| 2009/0185333 | A1 * | 7/2009 | Coomer | H02B 13/025 |
| | | | | 361/622 |
| 2009/0212022 | A1 * | 8/2009 | Josten | H02B 13/025 |
| | | | | 218/157 |
| 2012/0028559 | A1 * | 2/2012 | Kingston | H05K 5/0213 |
| | | | | 454/184 |
| 2013/0170104 | A1 * | 7/2013 | Kim | H02B 11/12 |
| | | | | 361/618 |
| 2014/0118887 | A1 * | 5/2014 | Deb | H02B 13/025 |
| | | | | 361/622 |
| 2014/0131090 | A1 * | 5/2014 | Gingrich | H02B 1/565 |
| | | | | 174/560 |
| 2016/0035518 | A1 * | 2/2016 | Pawar | H02B 1/56 |
| | | | | 218/157 |

FOREIGN PATENT DOCUMENTS

| | | |
|---|---|---|
| JP | 4937350 B2 | 5/2012 |
| JP | 5017003 B2 | 9/2012 |
| KR | 10-1173034 B1 | 8/2012 |
| KR | 10-2014-0092918 A | 7/2014 |
| WO | WO 2008/136113 A1 | 11/2008 |
| WO | WO 2009/001425 A1 | 12/2008 |
| WO | WO 2013/099393 A1 | 7/2013 |
| WO | 2013/189704 A1 | 12/2013 |

OTHER PUBLICATIONS

Written Opinion (PCT/ISA/237) dated Dec. 1, 2015, by the Japanese Patent Office as the International Searching Authority for International Application No. PCT/JP2015/075041.
Office Action (1st Examination Opinion Notice) dated Jan. 17, 2018, by the State Intellectual Property Office (SIPO) of the People's Republic of China in corresponding Chinese Patent Application No. 201580050249.6 and an English Translation of the Office Action. (12 pages).
Office Action (Notification of Reason for Refusal) dated Jan. 29, 2018, by the Korean Intellectual Property Office in corresponding Korean Patent Application No. 10-2016-7035576 and an English Translation of the Office Action. (9 pages).
The extended European Search Report dated Mar. 22, 2018, by the European Patent Office in corresponding European Patent Application No. 15843515.6-1201 (8 pages).
Office Action issued on Jul. 18, 2018, by the Chinese Patent Office in corresponding Chinese Patent Application No. 201580050249.6 and English translation of the Office Action. (13 pages).

* cited by examiner

PRIOR ART

PRIOR ART

SWITCHGEAR

TECHNICAL FIELD

The present invention relates to a metal enclosed switchgear in which an electric power apparatus such as a circuit breaker is contained and, more particularly, relates to the structure of an air intake opening portion of a switchgear provided with an air supply and discharge opening through which ambient air is taken in to perform ventilation because a current rating is large.

BACKGROUND ART

In a metal enclosed switchgear having a large current capacity rating, conductor temperature and ambient air temperature increase by Joule heat generation due to energization to main circuit conductors and induction heat generation of a structural object around the conductors. In order to suppress this temperature rise to a certain level, the air around the switchgear is taken in to lower internal air temperature by convection in the inside of the switchgear. In order to maintain a conductor portion or the like to be equal to or lower than a certain temperature, a structure is generally devised such that an air intake opening is provided at a relatively low position of the back surface and/or the front surface of the switchgear and an air discharge opening is provided in a ceiling portion to increase ventilation efficiency by use of a head difference between the air intake and the air discharge openings in addition to the convection in the switchgear.

Although extremely rare, during operation of the switchgear, an electrical fault may occur in the main circuit in the inside of the switchgear due to various causes. When the electrical fault occurs, an arc is generated at that portion; and by arc energy thereof, a rapid internal pressure rise and high temperature and high pressure gas are generated.

In a conventional metal enclosed switchgear having a relatively small current rating, air intake and discharge openings for ventilation are not generally provided; and accordingly, when high temperature and high pressure gas is generated in the inside, the high temperature and high pressure gas is discharged outside the switchgear from a pressure relief opening provided in a ceiling of the switchgear by only opening a pressure relief plate. In this regard, however, in a switchgear having a large current rating, high temperature gas is blown out from not only a pressure relief opening and an air discharge opening portion for ventilation in a ceiling portion, but also an air intake opening provided in the rear surface or the front surface of the switchgear.

Basically, the pressure relief opening during a fault is provided; and therefore, the blowout of the high temperature gas during the fault from the air discharge opening for ventilation in the ceiling portion of the switchgear is not a problem even when the high temperature gas is blown out therefrom. However, the blowout of the high temperature gas from the air intake opening for ventilation provided in the back surface or the front surface of the switchgear needs to be suppressed.

Thus, for example, a switchgear shown in Patent Document 1 and Patent Document 2 is made such that a check valve type shutter provided on an air intake opening portion operates in response to an internal pressure rise due to an abnormal internal pressure rise during a fault of the switchgear and blocks the air intake opening from the inside. This prevents the high temperature and high pressure gas from flowing back in a ventilation path and releasing to the periphery of the switchgear.

PRIOR ART DOCUMENT

Patent Document

[Patent Document 1] JP,4937350,B
[Patent Document 2] JP,5017003,B

SUMMARY OF THE INVENTION

Problem to be Solved by the Invention

In the aforementioned conventional switchgear, it is generally known that the arc generated in the switchgear is transferred from the power supply side toward the down stream side. The generated arc may extend to cause a ground fault to a grounding metal in the inside of the switchgear. In the case of a configuration shown by FIG. 5 and FIG. 6, if a strayed arc goes through a check valve type shutter 14 to cause a ground fault at a place 19 shown by FIG. 5, the force 22 of the opening direction of the shutter is exerted on the check valve type shutter 14 by Fleming's left hand rule under the influence of a ground fault current 20 due to the arc and a magnetic field 21 generated by the ground fault current 20 as shown in FIG. 6. By the influence of the force 22 of the opening direction of the shutter, the check valve type shutter 14 cannot perform the original close operation, so that an air intake opening 13 cannot be blocked and the check valve type shutter 14 is likely to be opened. Accordingly, the distance from a charged portion in the switchgear to the check valve type shutter 14 has to be secured and a problem exists in that the dimensions of the switchgear becomes large.

The present invention has been made to solve the aforementioned problem, and an object of the present invention is to provide a switchgear which improves reliability of a function that prevents high temperature and high pressure gas generated by an internal short circuit fault of the switchgear from flowing out to the outside of the switchgear from an air intake opening by closing a check valve type shutter, which is the original object of the shutter.

Means for Solving the Problem

According to the present invention, there is provided a switchgear including: an air intake mechanism attachment body arranged on an air intake portion provided on a housing; an air intake opening provided in the air intake mechanism attachment body; a check valve type shutter which is arranged on the inner side of the air intake opening on the housing, performs an air intake from the outside of the housing, and blocks the air intake opening in the occurrence of an internal short circuit fault; and a ground fault partition body which is arranged between said check valve type shutter and a conductive portion in said housing and in which the length of at least one side is longer than said check valve type shutter.

Furthermore, according to the present invention, there is provided a switchgear including: an air intake mechanism attachment body arranged on an air intake portion provided on a housing; an air intake opening provided in the air intake mechanism attachment body; a check valve type shutter which is arranged on the inner side of the air intake opening on the housing, performs an air intake from the outside of the housing, and blocks the air intake opening in the occurrence of an internal short circuit fault; and a ground fault frame body which is arranged between said check valve type shutter and a conductive portion in said housing and in which the length of at least one side is longer than said check valve type shutter.

Effects of the Invention

According to a switchgear according to the present invention, there can be obtained a switchgear which prevents high temperature and high pressure gas generated by an internal short circuit fault of the switchgear from flowing out to the outside of the switchgear from an air intake opening and can improve reliability.

MODE FOR CARRYING OUT THE INVENTION

Embodiment 1

Figure 1:
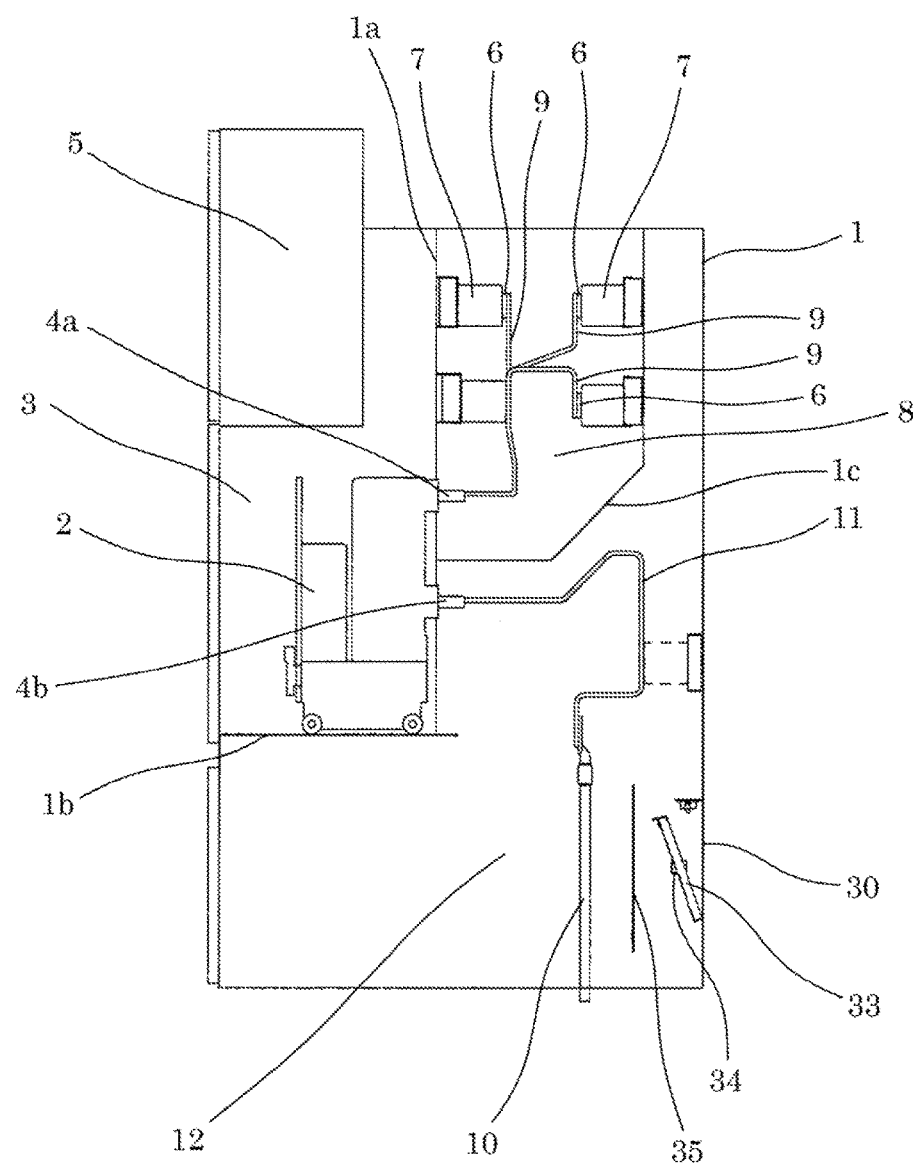
FIG. 1 is a cross-sectional side view showing a switchgear according to Embodiment 1 of the present invention.
Figure 2:
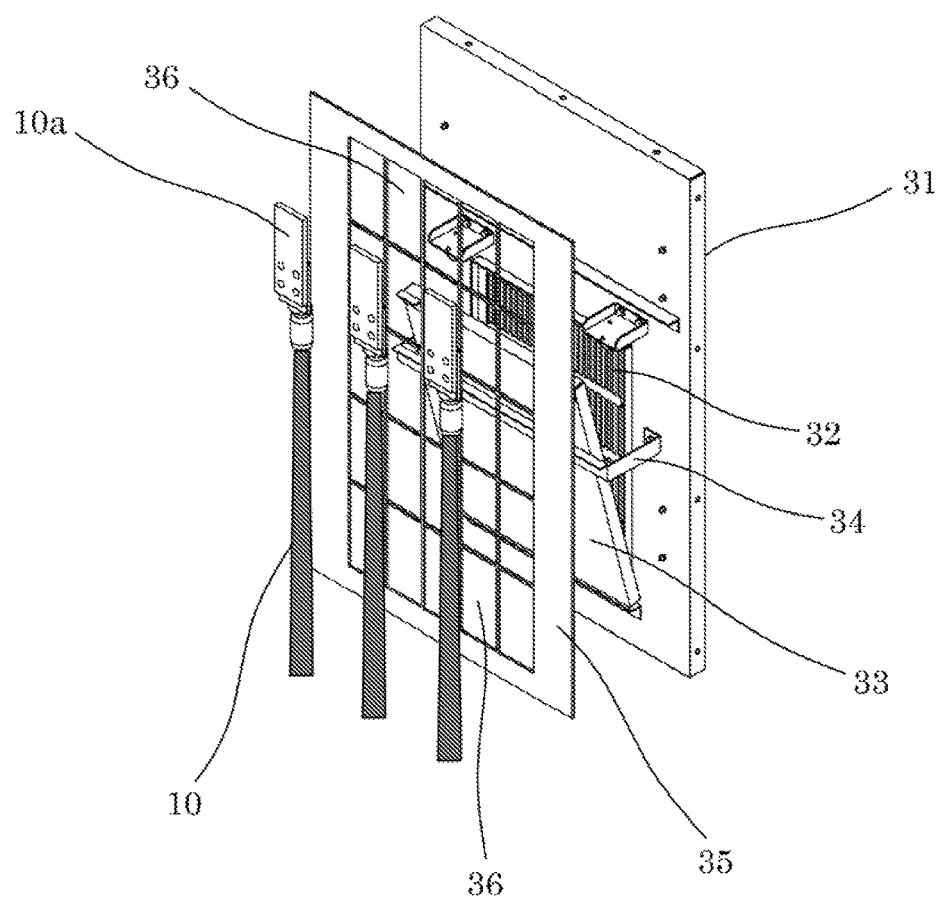
FIG. 2 is a perspective view showing the rear surface side in the switchgear according to Embodiment 1 of the present invention.

Hereinafter, Embodiment 1 of the present invention will be described on the basis of FIG. 1 and FIG. 2. Then, in each of the drawings, identical or equivalent members and portions will be described with the same reference numerals (and letters) assigned thereto. FIG. 1 is across-sectional side view showing a switchgear according to Embodiment 1 of the present invention. FIG. 2 is a perspective view showing the rear surface side in the switchgear according to Embodiment 1 of the present invention.

The internal configuration of the switchgear will be described by these drawings. The inside of a grounding metallic housing 1 is comparted into a plurality of compartments. A circuit breaker compartment 3, in which a drawing type circuit breaker 2 is contained, is arranged in an upper stage of the front side (the left in the drawing) of a housing 1, the circuit breaker compartment 3 being defined by a grounding metallic partition wall 1a and a partition wall 1b. The circuit breaker 2 is drawable from the front side of the switchgear. An upper stage side disconnecting unit 4a and a lower stage side disconnecting unit 4b of a main circuit vertically spaced with a predetermined interval are provided in a fixed condition to a rear wall of the circuit breaker compartment 3 so as to be attachable/detachable to/from a connection terminal (not shown in the drawing) protruded to the rear surface (the right in the drawing) of the circuit breaker 2. The upper side of the circuit breaker compartment 3 serves as a control device compartment 5 in which control devices (not shown in the drawing) are contained.

The upper side of the back surface side of the circuit breaker compartment 3 is defined by the grounding metallic partition wall 1a and a partition wall 1c and serves as a busbar compartment 8 in which three phase busbars 6 supported by insulators 7 and branch conductors 9 placed corresponding to the busbars 6 are disposed. The upper stage side disconnecting unit 4a connected on the upper stage side of the circuit breaker 2 is connected to the busbar 6 by the branch conductor 9 to be contained in the busbar compartment 8. The rear side and the lower side of the busbar compartment 8 serve as a cable compartment 12 in which a cable 10 of the down stream side and a down stream side conductor 11 are contained. One end portion 10a of the cable 10 is connected to the down stream side conductor 11 to be connected via the down stream side conductor 11 to the lower stage side disconnecting unit 4b connected to the lower stage side of the circuit breaker 2; and the other end is connected to an external cable (not shown in the drawing).

An air intake portion 30 that performs an air intake from the outside of the switchgear is provided on the housing 1, for example, on a lower rear wall (the lower rear surface wall side of the switchgear) of the cable compartment 12. An air intake mechanism attachment body 31 is arranged on the air intake portion 30 provided on the housing 1; and an air intake opening 32 composed of a plurality of slit-shaped wind windows is provided in the air intake mechanism attachment body 31. A check valve type shutter 33, which is faced to the air intake opening 32 to perform an air intake from the outside of the housing 1 and to block the air intake opening 32 in the occurrence of an internal short circuit fault, is arranged on the inner side of the air intake opening 32 on the housing 1. An opening position which is for performing the air intake of the check valve type shutter 33 is maintained by an air intake position support body 34. A ground fault partition body 35 is arranged between the check valve type shutter 33 and, for example, the cable 10 connected to the down stream side conductor 11 that is a conductive portion in the housing 1.

Figure 5:
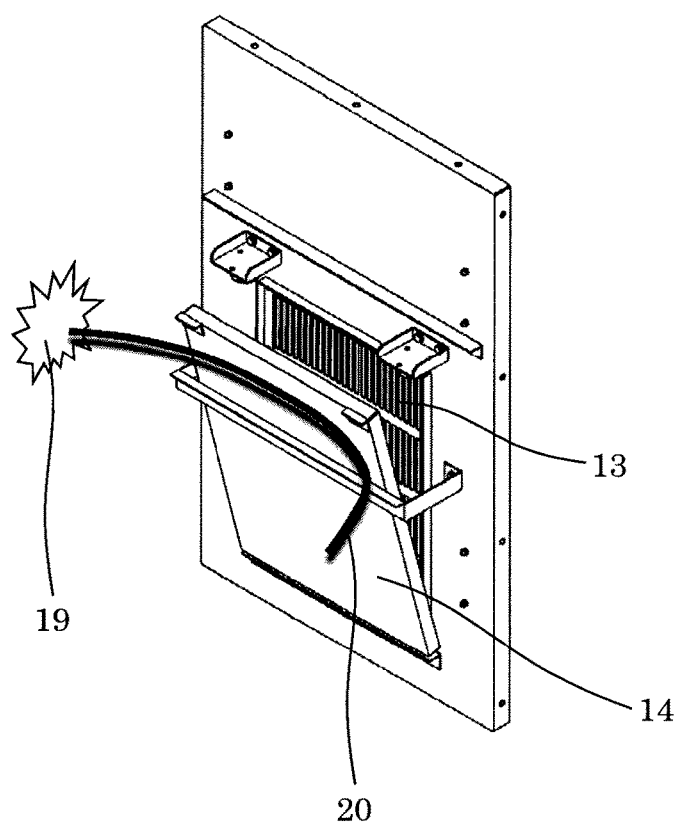
FIG. 5 is a perspective view showing a ground fault condition in a conventional switchgear.
Figure 6:
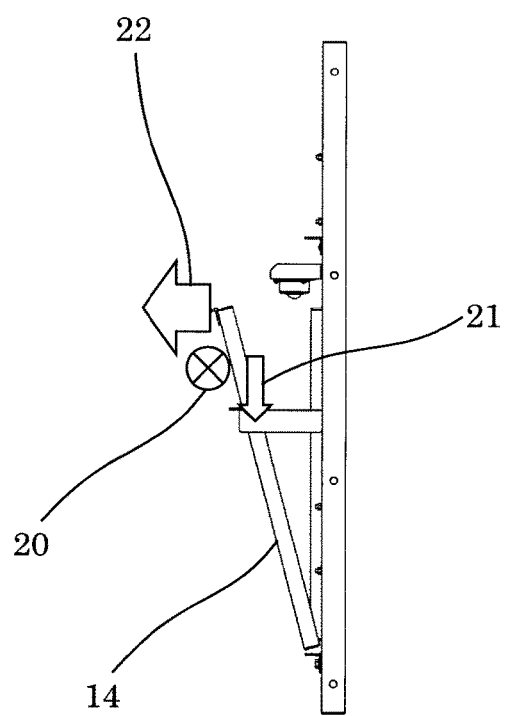
FIG. 6 is a side view showing the ground fault condition in the conventional switchgear.

FIG. 2 is a perspective view showing the rear surface side in the switchgear of FIG. 1. It is desirable to use a material made of a conductive metal plate for the ground fault partition body 35 so that a strayed arc easily causes a ground fault. When an arc generated on the down stream side conductor 11 strays and comes close to the check valve type shutter 33, the arc causes the ground fault not via the check valve type shutter 33 but via the ground fault partition body 35; and therefore, the generation of the force 22 of the opening direction of the shutter shown by FIG. 5 and FIG. 6 can be prevented. Therefore, if a necessary insulation distance from the ground fault partition body 35 to, for example, the cable 10 connected to the down stream side conductor 11 that is the conductive portion in the housing 1 is secured, a space equal to or more than the insulation distance does not need to be secured taking account of the stray arc and compactification of the switchgear can be achieved.

An opening portion 36 is provided in the ground fault partition body 35 so as not to cause a delay in the close operation of the check valve type shutter 33, the delay being due to that fluid resistance generated by the ground fault partition body 35 gives an influence on high pressure propagation during the internal short circuit fault. If the opening portion 36 is too large, the strayed arc does not cause a ground fault via the ground fault partition body 35, but the strayed arc causes the ground fault via the check valve type shutter 33. Thus, the ground fault partition body 35 is formed with the opening portion 36 having a size in which the strayed arc causes the ground fault via the ground fault partition body 35.

Incidentally, the internal configuration of the switchgear shown in FIG. 1 represents an example and is not limited to the arrangement configuration of the drawing. In FIG. 1, there is shown a case where the air intake portion 30 is provided on the lower rear wall (the lower rear surface wall side of the switchgear) of the cable compartment 12, but not limited to this. For example, a configuration where the air intake portion 30 is provided on the lower left front surface side (the lower front side of the switchgear) of the cable compartment 12 in FIG. 1, or on the lower lateral side (the lower lateral side of the switchgear) of the cable compartment 12 in FIG. 1, or on a floor portion of the switchgear, or a configuration other that is also permissible. Each case represents the switchgear which is provided with the ground fault partition body 35 which is for suppressing the influence of the arc on the check valve type shutter 33 with respect to the switchgear equipped with a mechanism which includes: the normal air intake portion 30 for ventilation; and the check valve type shutter 33 that faces a place where the high temperature and high pressure gas is flown back in the air intake portion 30 during the internal short circuit fault to be discharged to the outside of the switchgear.

As described above, according to Embodiment 1, the strayed arc causes the ground fault not via the check valve type shutter 33 but via the ground fault partition body 35 in the switchgear which includes: the air intake opening 32 provided on the front surface, the rear surface, or the like of the switchgear; and the check valve type shutter 33 that blocks the air intake opening 32 during the internal short circuit fault. Therefore, since the arc does not go through the check valve type shutter 33, there does not occur a phenomenon in which the check valve type shutter 33 is opened, reliability of the operation of the check valve type shutter 33 is remarkably improved and the switchgear can be made compact as compared to the aforementioned Patent Document 1 and Patent Document 2.

Embodiment 2

Figure 3:
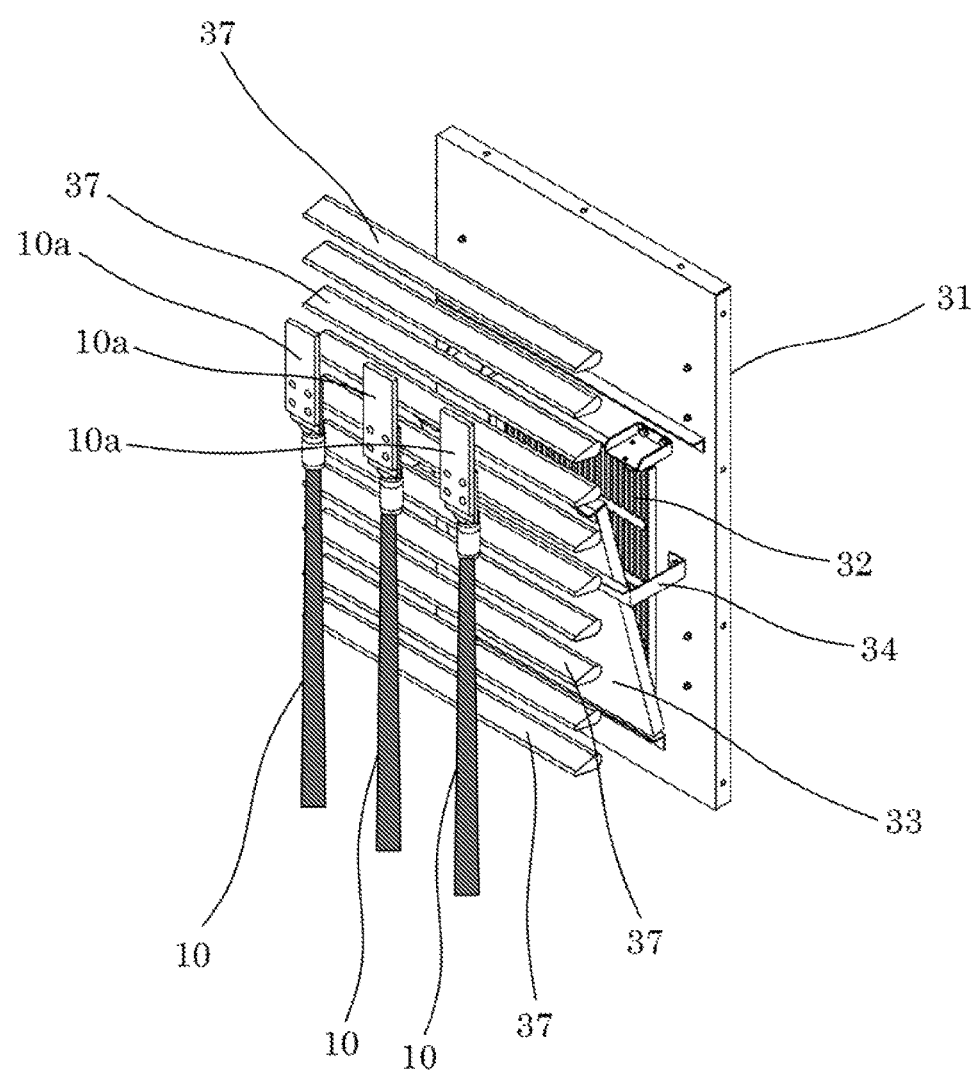
FIG. 3 is a perspective view showing the rear surface side in a switchgear according to Embodiment 2 of the present invention.

Embodiment 2 of the present invention will be described on the basis of FIG. 3. FIG. 3 is a perspective view showing the rear surface side in a switchgear according to Embodiment 2 of the present invention.

FIG. 3 represents a structure according to Embodiment 2 of the present invention, in which a ground fault frame body 37 is arranged between a check valve type shutter 33 and, for example, a cable 10 connected to a down stream side conductor 11 that is a conductive portion in a housing 1, in place of the ground fault partition body 35 shown in FIG. 2. As shown in FIG. 3, the ground fault frame bodies 37 are extended in a vertical direction and are each arranged in a direction perpendicular to the cable 10 connected to the down stream side conductor 11. The ground fault frame bodies 37 are provided in the vertical direction in plural numbers. The plurality of these ground fault frame bodies 37 are arranged at such an interval that a strayed arc goes therethrough to cause a ground fault.

These ground fault frame bodies 37 are each configured in a streamlined shape that reduces flow velocity resistance against propagation of high temperature and high pressure gas during an internal short circuit fault as shown in FIG. 3; and thus, fluid resistance generated by arranging the ground fault frame bodies 37 is reduced and the strayed arc causes the ground fault not via the check valve type shutter 33 but via the ground fault frame body 37.

Therefore, since the arc does not go through the check valve type shutter 33, there does not occur a phenomenon in which the check valve type shutter 33 is opened, reliability of the operation of the check valve type shutter 33 is remarkably improved and the switchgear can be made compact as compared to the aforementioned Patent Document 1 and Patent Document 2.

Embodiment 3

Figure 4:
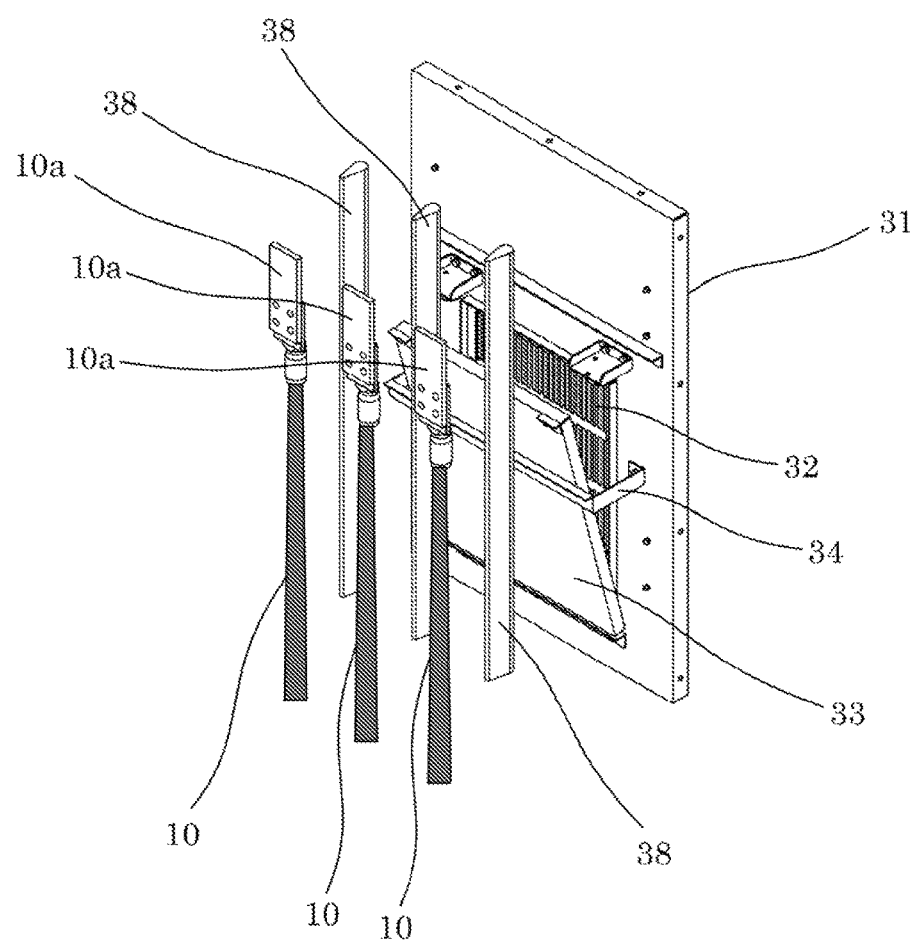
FIG. 4 is a perspective view showing the rear surface side in a switchgear according to Embodiment 3 of the present invention.

Embodiment 3 of the present invention will be described on the basis of FIG. 4. FIG. 4 is a perspective view showing the rear surface side in a switchgear according to Embodiment 3 of the present invention.

FIG. 4 represents a structure according to Embodiment 3 of the present invention, in which a ground fault frame body 38 is arranged between a check valve type shutter 33 and, for example, a cable 10 connected to a down stream side conductor 11 that is a conductive portion in the inside of a housing 1, in place of the ground fault frame body 37 shown in FIG. 3. As shown in FIG. 4, the ground fault frame body 38 is extended in a vertical direction and is arranged in a direction parallel to the cable 10 connected to the down stream side conductor 11. The ground fault frame bodies 38 are provided in a horizontal direction in plural numbers. The plurality of these ground fault frame bodies 38 are arranged at such an interval that a strayed arc goes therethrough to cause a ground fault.

These ground fault frame bodies 38 are each configured in a streamlined shape that reduces flow velocity resistance against propagation of high temperature and high pressure gas during an internal short circuit fault as shown in FIG. 4; and thus, fluid resistance generated by arranging the ground fault frame bodies 38 is reduced and the strayed arc causes the ground fault not via the check valve type shutter 33 but via the ground fault frame body 38.

Therefore, since the arc does not go through the check valve type shutter 33, there does not occur a phenomenon in which the check valve type shutter 33 is opened, reliability of the operation of the check valve type shutter 33 is remarkably improved and the switchgear can be made compact as compared to the aforementioned Patent Document 1 and Patent Document 2.

Furthermore, the ground fault frame body 38 is arranged in the direction parallel to, for example, the cable 10 connected to the down stream side conductor 11 that is the conductive portion in the inside of the housing 1; and thus, the ground fault is likely to be caused and therefore the interval between the ground fault frame bodies 38 can be elongated and an improvement in reliability of the operation of the check valve type shutter 33 can be inexpensively actualized.

Incidentally, the present invention can freely combine the respective embodiments and appropriately modify and/or omit the respective embodiments, within the scope of the present invention.

INDUSTRIAL APPLICABILITY

The present invention is suitable for actualizing a switchgear which improves reliability of the operation of a check valve type shutter and can achieve compactification.

DESCRIPTION OF REFERENCE NUMERALS

1 Housing, 10 Cable, 30 Air intake portion, 31 Air intake mechanism attachment body, 32 Air intake opening, 33

Check valve type shutter, 35 Ground fault partition body, 36 Opening portion, 37 Ground fault frame body, and 38 Ground fault frame body.

The invention claimed is:

1. A switchgear, comprising:
   an air intake mechanism attachment body arranged on an air intake portion provided on a housing;
   an air intake opening provided in said air intake mechanism attachment body;
   a check valve type shutter arranged on an inner side of said air intake opening on said housing, performs an air intake from the outside of said housing, and blocks said air intake opening in the occurrence of an internal short circuit fault; and
   a ground fault partition body having electrical conductivity and configured to make a strayed arc cause a ground fault, the ground fault partition body arranged between said check valve type shutter and a conductive portion in said housing and in which a length of at least one side is longer than said check valve type shutter.

2. The switchgear according to claim 1,
   wherein said ground fault partition body is made of a metal plate.

3. The switchgear according to claim 1,
   wherein said ground fault partition body is formed with an opening portion.

4. The switchgear according to claim 2,
   wherein said ground fault partition body is formed with an opening portion.

5. A switchgear, comprising:
   an air intake mechanism attachment body arranged on an air intake portion provided on a housing;
   an air intake opening provided in said air intake mechanism attachment body;
   a check valve type shutter arranged on an inner side of said air intake opening on said housing, performs an air intake from the outside of said housing, and blocks said air intake opening in the occurrence of an internal short circuit fault; and
   a ground fault frame body having electrical conductivity and configured to make a strayed arc cause a ground fault, the ground fault frame body arranged between said check valve type shutter and a conductive portion in said housing and in which a length of at least one side is longer than said check valve type shutter.

6. The switchgear according to claim 5,
   wherein said ground fault frame body is configured in a streamlined shape that reduces flow velocity resistance against propagation of high temperature and high pressure gas during an internal short circuit fault.

7. The switchgear according to claim 5,
   wherein said ground fault frame body is arranged in a direction perpendicular to said conductive portion in said housing.

8. The switchgear according to claim 6,
   wherein said ground fault frame body is arranged in a direction perpendicular to said conductive portion in said housing.

9. The switchgear according to claim 5,
   wherein said ground fault frame body is arranged so as to be parallel to said conductive portion in said housing.

10. The switchgear according to claim 6,
    wherein said ground fault frame body is arranged so as to be parallel to said conductive portion in said housing.

* * * * *